US012774749B2

(12) United States Patent
Yuan

(10) Patent No.: US 12,774,749 B2
(45) Date of Patent: Oct. 27, 2026

(54) AIR INLET ADJUSTMENT STRUCTURE OF NEGATIVE PRESSURE REGULATOR

(71) Applicant: BIBOTING INTERNATIONAL CO., LTD., Taoyuan City (TW)

(72) Inventor: Li-Pin Yuan, Taoyuan City (TW)

(73) Assignee: BIBOTING INTERNATIONAL CO., LTD., Taoyuan City (TW)

( * ) Notice: Subject to any disclaimer, the term of this patent is extended or adjusted under 35 U.S.C. 154(b) by 613 days.

(21) Appl. No.: 18/234,869

(22) Filed: Aug. 16, 2023

(65) Prior Publication Data

US 2025/0060038 A1 Feb. 20, 2025

(51) Int. Cl.
*F16K 1/04* (2006.01)
*A61H 9/00* (2006.01)
*F16K 27/02* (2006.01)
*F16K 31/60* (2006.01)

(52) U.S. Cl.
CPC ............. *F16K 1/04* (2013.01); *A61H 9/0057* (2013.01); *F16K 27/02* (2013.01); *F16K 31/60* (2013.01); *A61H 2201/5056* (2013.01)

(58) Field of Classification Search
CPC . F16K 1/04; F16K 27/02; F16K 31/60; A61H 9/0057; A61H 2201/5056
See application file for complete search history.

(56) References Cited

U.S. PATENT DOCUMENTS 2,793,830 A * 5/1957 Nakaji .................... F16K 24/06 285/364
3,695,293 A * 10/1972 Zeuner .................... F16K 11/10 137/625.48
3,985,156 A * 10/1976 Walker .................... F17C 13/04 251/351
4,239,057 A * 12/1980 Frosch .............. A61G 7/05753 128/DIG. 20
4,273,153 A * 6/1981 Brown .................... F16K 27/06 137/526

FOREIGN PATENT DOCUMENTS

CN 209900007 U 1/2020

OTHER PUBLICATIONS

Office Action dated Oct. 30, 2023 of the corresponding Taiwan patent application No. 112126164.

* cited by examiner

*Primary Examiner* — Eric Keasel
(74) *Attorney, Agent, or Firm* — HDLS IPR SERVICES; Chun-Ming Shih

(57) ABSTRACT

A negative pressure regulator includes a regulator body, a pressure relief nut, and a swivel assembly. The regulator body includes a valve body and a cylinder connected to the valve body. The valve body includes an airflow passage. The cylinder includes a mounting hole and an air inlet communicating with the airflow passage. The pressure relief nut is disposed in the mounting hole and includes a relief hole and an air outlet connected with each other. The swivel assembly includes a cap and a knob connected with each other. The cap covers the cylinder and is rotatable relative to the valve body. The knob is inserted in the pressure relief nut and driven by the cap to optionally move away from the air outlet. When the air flowing into the airflow passage is adjusted, the airflow rate and noise may be reduced.

9 Claims, 7 Drawing Sheets

AIR INLET ADJUSTMENT STRUCTURE OF NEGATIVE PRESSURE REGULATOR

BACKGROUND OF THE DISCLOSURE

Technical Field

The technical field relates to a negative pressure regulator, and more particularly relates to an air inlet adjustment structure of a negative pressure regulator.

Description of Related Art

A negative pressure instrument is a kind of equipment commonly used in treatment and medical care. It attracts and stimulates acupuncture points on skins to promote blood circulation and relieve discomfort through negative pressure. Thus, the purpose of regulating body functions may be achieved.

Moreover, the usage of a negative pressure instrument is equipped with a negative pressure regulator to adjust the pressure. However, the related-art negative pressure regulator has a disadvantage of excessive noise during the operation, and that not only reduces the comfort of use, but also may interfere with the treatment process and the environment of treatment.

In view of the above drawbacks, the inventor proposes this disclosure based on his expert knowledge and elaborate researches in order to solve the problems of related art.

SUMMARY OF THE DISCLOSURE

This disclosure is an air inlet adjustment structure of a negative pressure regulator, which is used to adjust the airflow flowing into the airflow passage, and the airflow rate and the noise may be reduced.

This disclosure is a negative pressure regulator including a regulator body, a pressure relief nut, and a swivel assembly. The regulator body includes a valve body and a cylinder connected to the valve body. The valve body includes an airflow passage. The cylinder includes a mounting hole and an air inlet communicating with the airflow passage. The pressure relief nut is disposed in the mounting hole, and includes a relief hole and an air outlet connected to the relief hole. The swivel assembly includes a cap and a knob connected with the cap. The cap covers the cylinder and is rotatable relative to the valve body. The knob is inserted in the pressure relief nut and driven by the cap to optionally move away from the air outlet to adjust the airflow flowing into the airflow passage. An external air enters the relief hole from the air inlet, and flows into the airflow passage, when the knob moves away from the air outlet, to adjust an airflow rate in the airflow passage.

In one embodiment, the valve body includes a main pipe and a pair of branch pipes communicating with the airflow passage, and the pair of branch pipes are located on two sides of the main pipe opposite to each other.

In one embodiment, the air inlet is multiple in number, and a plurality of air inlets are arranged spacedly on the cylinder.

In one embodiment, the negative pressure regulator further includes a first sealing ring clamped between an outer wall surface of the knob and an inner wall surface of the pressure relief nut.

In one embodiment, the negative pressure regulator further includes a second sealing ring clamped between an outer wall surface of the pressure relief nut and an inner wall surface of the cylinder.

In one embodiment, the pressure relief nut includes a convex ring, and the second sealing ring abuts against a side of the convex ring.

In one embodiment, an airflow gap is defined between the cap and the cylinder.

In one embodiment, the relief hole is located adjacent to communicates with the air inlet.

In one embodiment, the cap includes a flange, and the flange includes an annular groove disposed on a side thereof facing the valve body.

In one embodiment, the valve body includes an annular rib disposed corresponding to the annular groove, and a backflow gap is defined between the annular rib and the annular groove.

In comparison with the related art, the negative pressure regulator of this disclosure includes a regulator body, a pressure relief nut, and a swivel assembly. Moreover, the knob of the swivel assembly is inserted in the pressure relief nut and driven by the cap to extend and retract at the air outlet to optionally move away from the air outlet to control the airflow rate flowing into the airflow passage. Therefore, the flow rate of the external air entering the valve body may be adjusted, and the airflow inside the negative pressure cup of the negative pressure regulator is adjusted. As a result, the airflow rate and the noise may be reduced.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
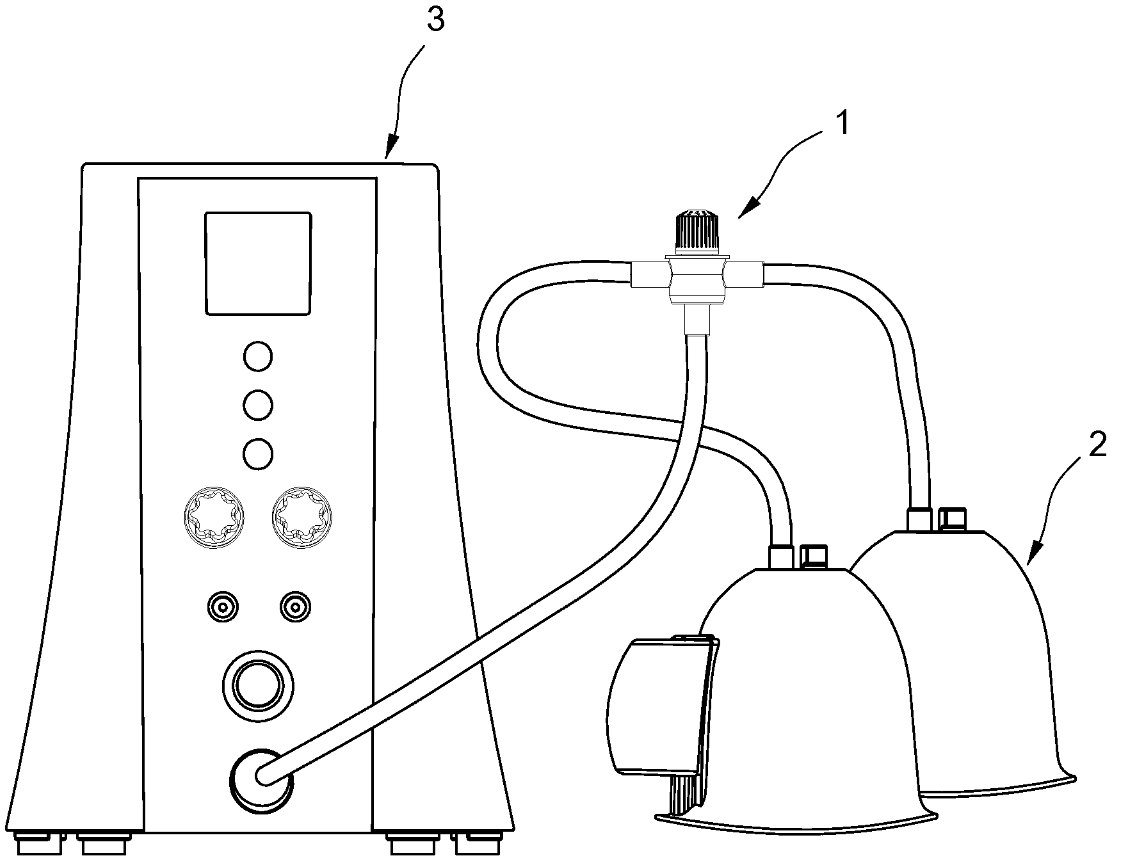
FIG. 1 is an application schematic view of the negative pressure regulator in this disclosure.

Please refer to FIG. 1, which is an application schematic view of the negative pressure regulator in this disclosure. This disclosure is a negative pressure regulator 1 used to adjust the negative pressure inside a negative pressure cup 2. In one embodiment of this disclosure, the negative pressure cup 2 is connected to a negative pressure instrument 3, and the negative pressure regulator 1 is arranged between the negative pressure cup 2 and the negative pressure instrument 3. Furthermore, the negative pressure instrument 3 generates negative pressure air during the operation and supplies that to the negative pressure cup 2. The upper limit of the negative pressure in the negative pressure cup 2 may be adjusted through the negative pressure regulator 1.

It is worth noticing that the pressure in the negative pressure cup 2 may be adjusted through the operation of the negative pressure regulator 1, and the noise generated during the operation of the negative pressure cup 2 may be reduced.

Figure 2:
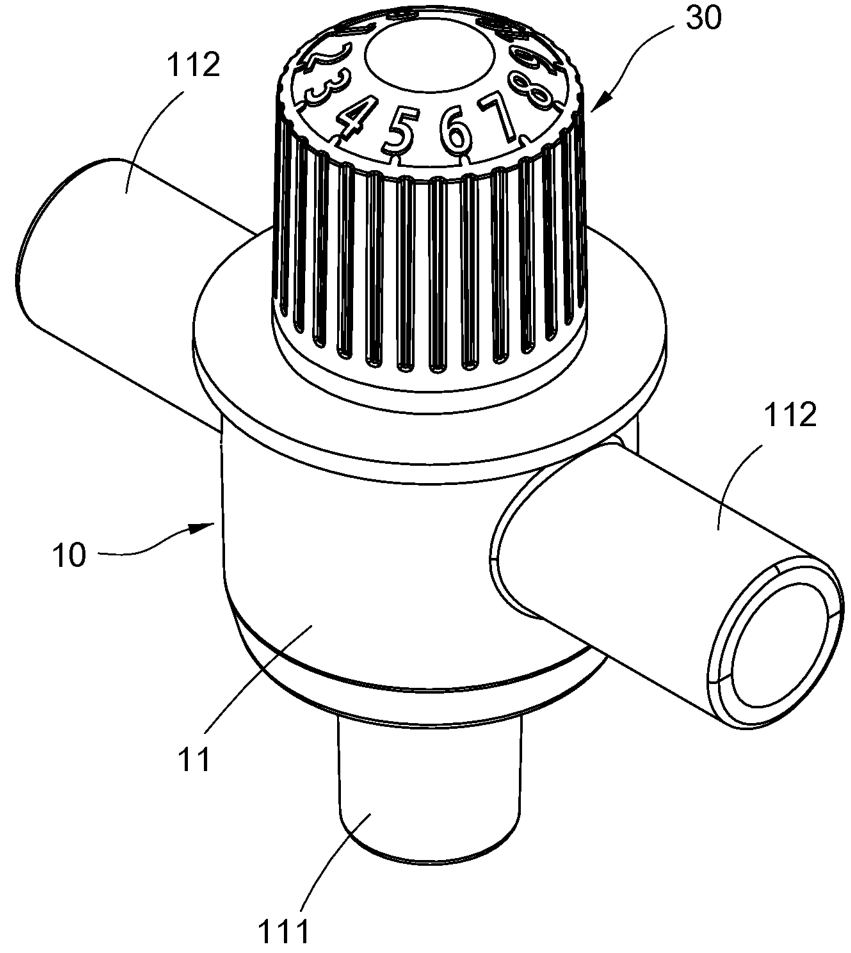
FIG. 2 is a perspective schematic view of the negative pressure regulator in this disclosure.
Figure 3:
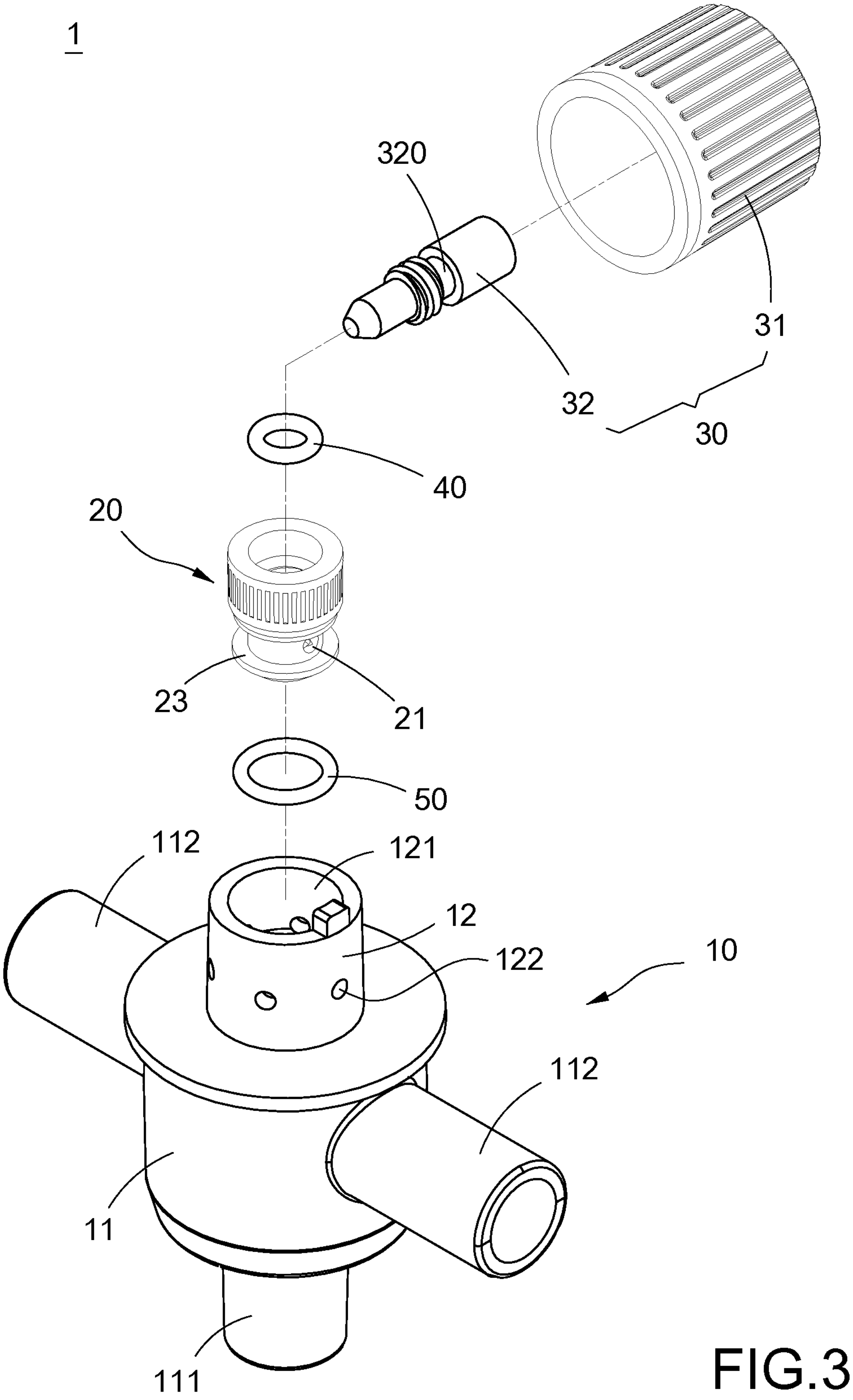
FIG. 3 is a perspective exploded schematic view of the negative pressure regulator in this disclosure.
Figure 4:
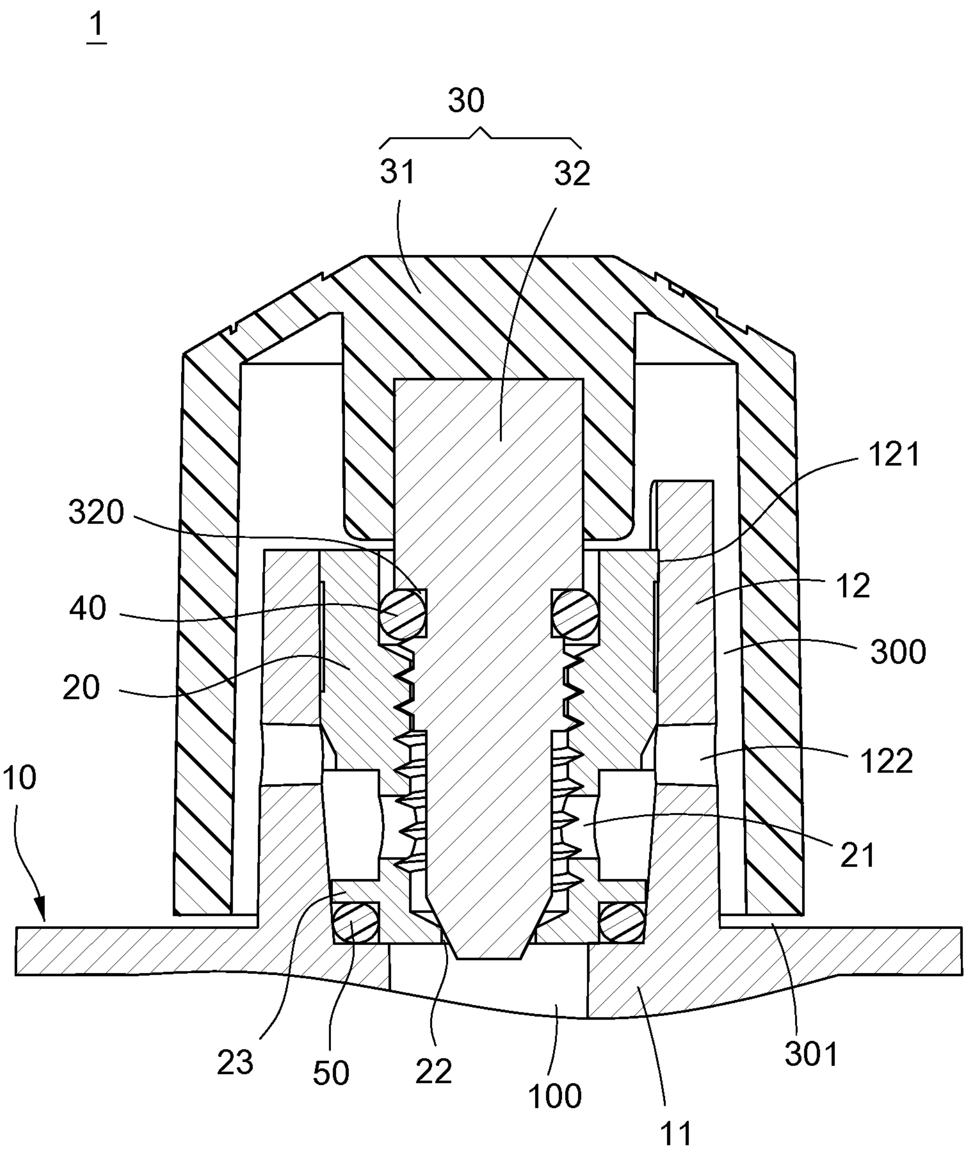
FIG. 4 is a cross-sectional view of the negative pressure regulator in this disclosure.

Please further refer to FIG. 2 to FIG. 4, which are a perspective schematic view, a perspective exploded schematic view and a cross-sectional view of the negative pressure regulator in this disclosure. This disclosure is an air inlet adjustment structure of a negative pressure regulator 1. The negative pressure regulator 1 includes a regulator body 10, a pressure relief nut 20 and a swivel assembly 30. The pressure relief nut 20 is disposed on the regulator body 10. The swivel assembly 30 is rotatably combined in the pressure relief nut 20 and may control the airflow rate flowing into the regulator body 10 from the pressure relief nut 20. More detailed of the air inlet adjustment structure of the negative pressure regulator 1 are as follows.

The regulator body 10 includes a valve body 11 and a cylinder 12 connected to the valve body 11. The valve body 11 includes an airflow passage 100. The cylinder 12 includes a mounting hole 121 and an air inlet 122 communicating with the airflow passage 100.

In this embodiment, the valve body 11 includes a main pipe 111 and a pair of branch pipes 112 communicating with the airflow passage 100. The pair of branch pipes 112 are located on two sides of the main pipe 111 opposite to each other, here is not intended to be limiting. Furthermore, the air inlet 122 is multiple in number, and a plurality of air inlets 122 are arranged spacedly on the cylinder 12.

The pressure relief nut 20 is disposed in the mounting hole 121. The pressure relief nut 20 is a nut made of metal material, but it is not limited thereto. The pressure relief nut 20 includes a relief hole 21 and an air outlet 22 communicating with the relief hole 21. In some embodiments, the relief hole 21 is located adjacent to and communicates with the air inlet 122.

Moreover, the swivel assembly 30 includes a cap 31 and a knob 32 connected with the cap 31. The cap 31 covers the cylinder 12 and is rotatable relative to the valve body 11.

The knob 32 is inserted in the pressure relief nut 20 and driven by the cap 31 to extend and retract at the air outlet 22 to optionally move away from the air outlet 22 to restrict (prevent) the air in the pressure relief nut 20 from flowing out of the air outlet 22. When the knob 32 moves away from the air outlet 22, the air trapped in the pressure relief nut 20 flows into the airflow passage 100.

Specifically, the negative pressure regulator 1 further includes a first sealing ring 40 and a second sealing ring 50. The first sealing ring 40 is clamped between the outer wall surface of the knob 32 and the inner wall surface of the pressure relief nut 20. In some embodiments, a groove 320 is disposed on the outer wall of the knob 32. The first sealing ring 40 is disposed in the groove 320.

Moreover, the second sealing ring 50 is clamped between the outer wall surface of the pressure relief nut 20 and the inner wall surface of the cylinder 12. In some embodiments, the pressure relief nut 20 includes a convex ring 23. The second sealing ring 50 abuts against a side of the convex ring 23.

When the swivel assembly 30 is screwed with the pressure relief nut 20 through the knob 32, an airflow gap 300 is defined between the cap 31 and the cylinder 12. Additionally, a bottom gap 301 is defined between the bottom edge of the cap 31 and the valve body 11. Accordingly, the external air enters the airflow gap 300 from the bottom gap 301, then flows into the cylinder 12 from the airflow gap 300 through the air inlet 122, and enters the pressure relief nut 20 through the pressure relief hole 21.

Figure 5:
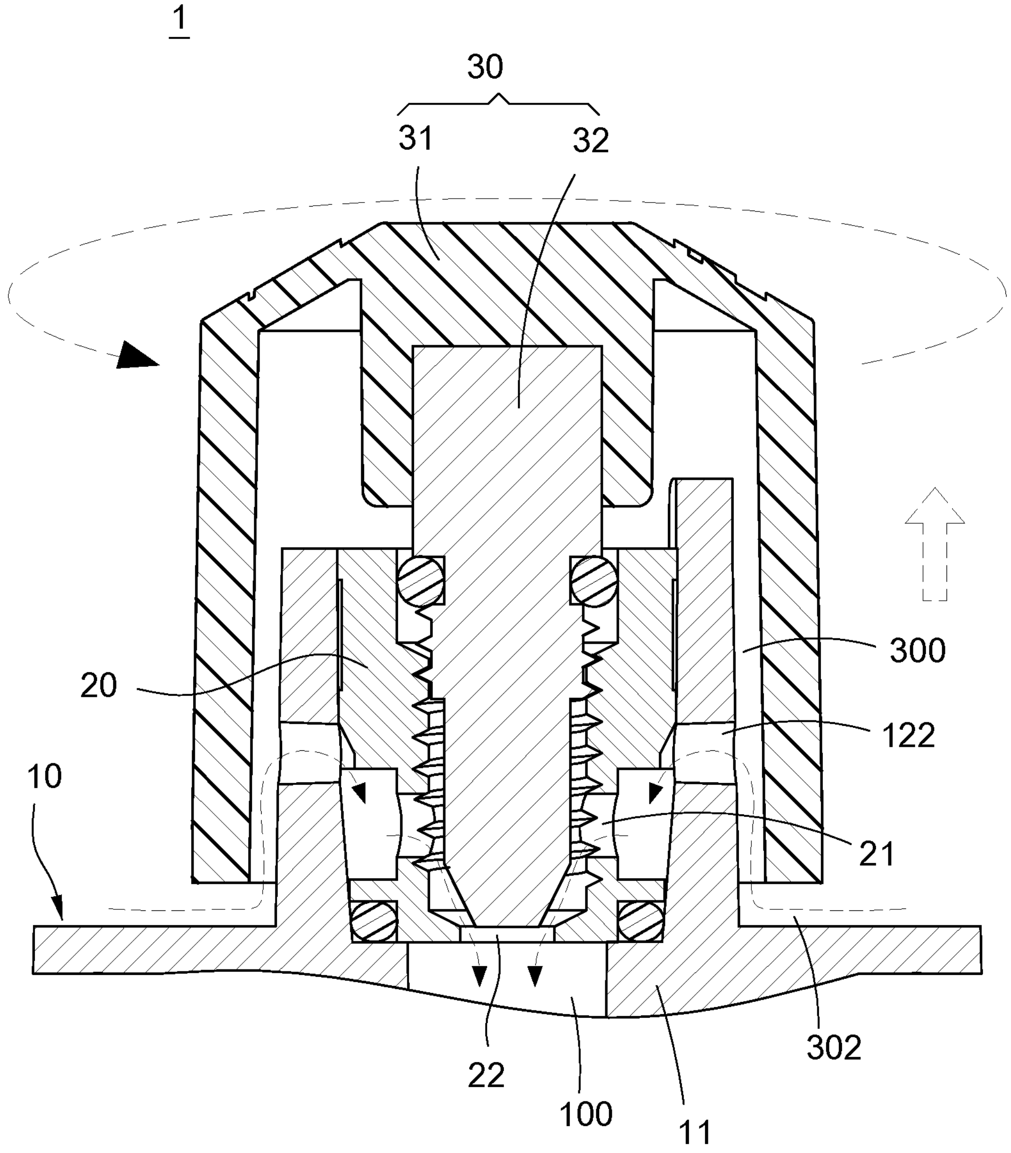
FIG. 5 is an air flow schematic view of the negative pressure regulator in this disclosure.

Please further refer to FIG. 5, which is an air flow schematic view of the negative pressure regulator in this disclosure. The negative pressure regulator 1 of this disclosure is used to adjust the flow of external air entering the valve body 11. When the negative pressure regulator 1 is in use, the cap 31 is rotated to make the bottom edge of the cap 31 move away from the valve body 11 to enlarge the bottom gap 301 to facilitate more external air flowing into the bottom gap 301. Subsequently, the external air may flow into the cylinder 12 through the air inlet 122, and then enters the pressure relief nut 20 through the pressure relief hole 21.

Moreover, the cap 31 is rotated to drive the knob 32 move away from the air outlet 22 and retract to the pressure relief nut 20. Then, the air flowing into the pressure relief nut 20 may flow out of the air outlet 22 and enter the valve body 11.

It is worth noticing that the airflow passage 100 communicates with the pair of branch pipes 112, and the pair of branch pipes 112 are connected with the negative pressure cup 2 (see FIG. 1). Accordingly, the air pressure in the negative pressure cup 2 may be adjusted through adjusting the airflow flowing into the airflow passage 100 by the negative pressure regulator 1. Therefore, the airflow rate in the airflow passage 100 and the noise may be reduced, and the effect of adjusting the upper limit of negative pressure is achieved.

Figure 6:
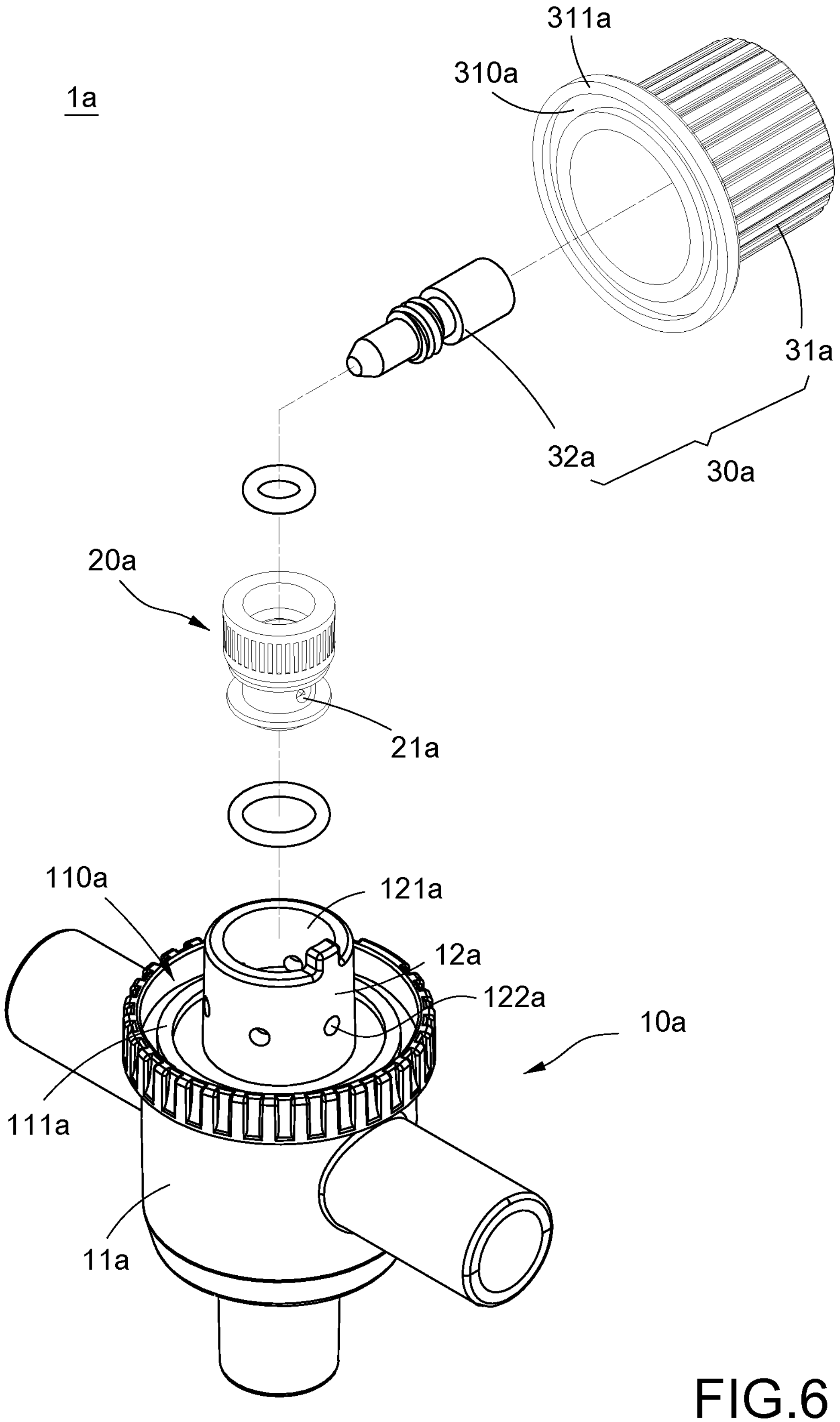
FIG. 6 is another embodiment of the air inlet adjustment structure of a negative pressure regulator in this disclosure.
Figure 7:
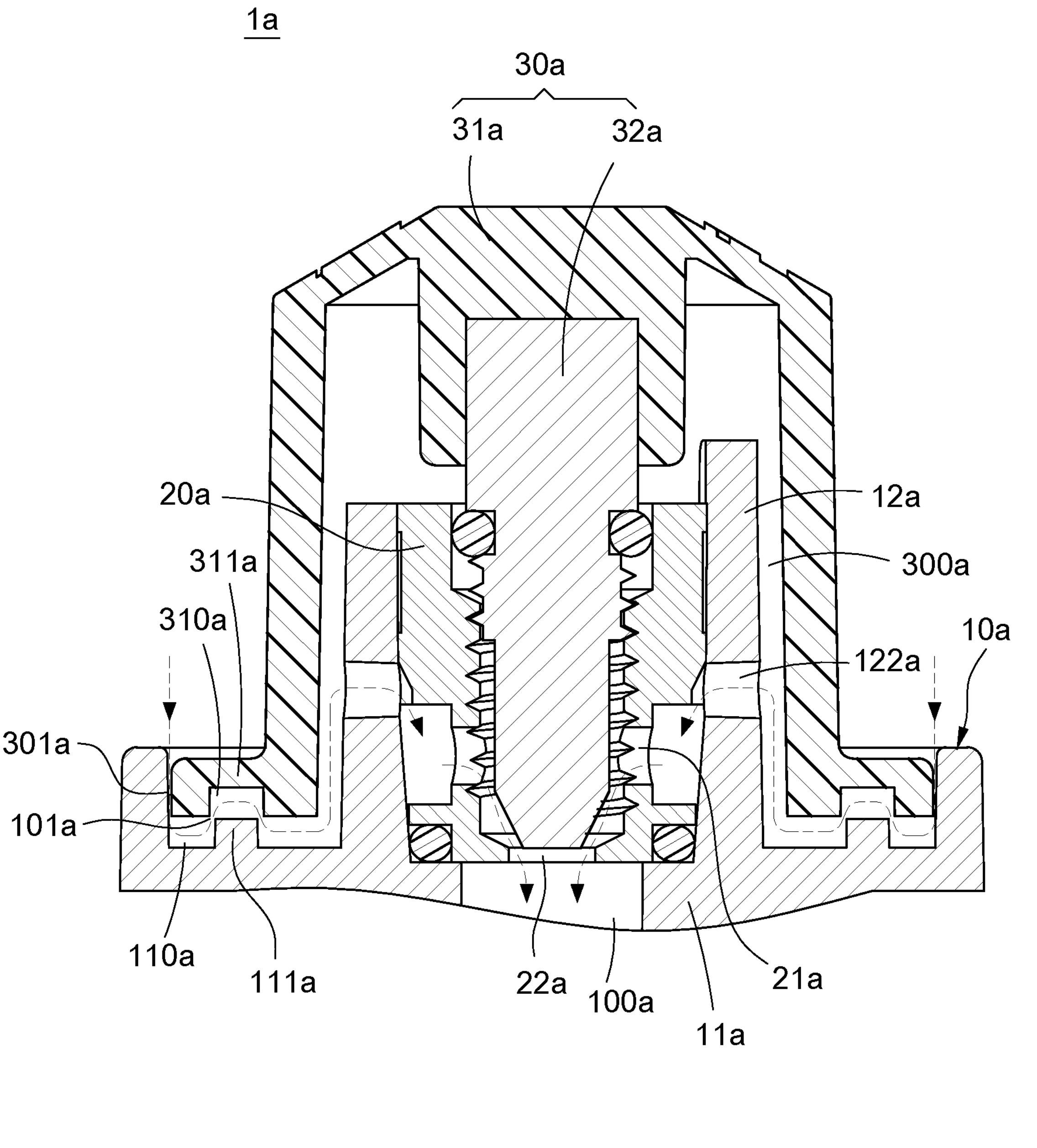
FIG. 7 is a cross-sectional view of another embodiment of the air inlet adjustment structure of a negative pressure regulator in this disclosure.

Please refer to FIG. 6 and FIG. 7, which are another embodiment of the air inlet adjustment structure of a negative pressure regulator in this disclosure and a cross-sectional view of another embodiment of the air inlet adjustment structure of a negative pressure regulator in this disclosure. This embodiment is similar to the previous embodiment. A negative pressure regulator 1*a* includes a regulator body 10*a*, a pressure relief nut 20*a* and a swivel assembly 30*a*. The regulator body 10*a* includes a valve body 11*a* and a cylinder 12*a*, and the valve body 11*a* includes an airflow passage 100*a*. The cylinder 12*a* includes a mounting hole 121*a* and an air inlet 122*a*. The pressure relief nut 20*a* includes a relief hole 21*a* and an air outlet 22*a*. The swivel assembly 30*a* includes a cap 31*a* and a knob 32*a*. Furthermore, the difference between this embodiment and the previous embodiment is that the arrangement of the airflow passage.

Specifically, the cap 31*a* includes a flange 311*a*, and the flange 311*a* includes an annular groove 310*a* disposed on a side thereof facing the valve body 11*a*. Additionally, the valve body 11*a* includes a receiving slot 110*a* disposed on a side facing the pressure relief nut 20*a*, and an annular rib 111*a* is disposed in the receiving slot 110*a* corresponding to the annular groove 310*a*. An airflow gap 300*a* is defined between the cap 31*a* and the cylinder 12*a*.

When the cap 31*a* covers the cylinder 12*a*, the flange 311*a* of the cap 31*a* is placed in the receiving slot 110*a*, and a gap 301*a* is defined between the outer periphery of the flange 311*a* and the inner wall surface of the receiving slot 110*a*. Moreover, a backflow gap 101*a* is defined between the annular rib 111*a* and the annular groove 310*a*.

Accordingly, the external air enters the receiving slot 110*a* from the gap 301*a*, and flows along the backflow gap 101*a* to pass through the annular groove 310*a* and the annular rib 111*a* and flows into the airflow gap 300*a*. Then, the external air passes through the air inlet 122*a* and the relief hole 21*a* from the airflow gap 300*a*, and enters the air passage 100*a* from the air outlet 22*a*.

It should be noted that the external air flows into the airflow passage 100*a* from the gap 300*a* to reduce the upper limit of the negative pressure inside the negative pressure cup 2 (see FIG. 1). As the flow path of the external air is bent and narrow, the flow rate is relatively slow. As a result, the noise may not be generated when the external air encounters obstacles, and the effect of reducing noise may be achieved.

While this disclosure has been described by means of specific embodiments, numerous modifications and variations could be made thereto by those skilled in the art without departing from the scope and spirit of this disclosure set forth in the claims.

What is claimed is:

1. A negative pressure regulator, comprising:

a regulator body, comprising a valve body and a cylinder connected to the valve body, the valve body comprising an airflow passage, the cylinder comprising a mounting hole and an air inlet communicating with the airflow passage;

a pressure relief nut, disposed in the mounting hole and comprising a relief hole and an air outlet communicating with the relief hole;

a swivel assembly, comprising a cap and a knob connected with the cap, the cap covering the cylinder and rotatable relative to the valve body, the knob inserted in the pressure relief nut and driven by the cap to optionally move away from the air outlet; and a first sealing ring clamped between an outer wall surface of the knob and an inner wall surface of the pressure relief nut;

wherein, an external air enters the relief hole from the air inlet, and flows into the airflow passage, when the knob moves away from the air outlet, to adjust an airflow rate in the airflow passage.

2. The negative pressure regulator according to claim 1, wherein the valve body comprises a main pipe and a pair of branch pipes communicating with the airflow passage, and the pair of branch pipes are located on two sides of the main pipe opposite to each other.

3. The negative pressure regulator according to claim 1, wherein a plurality of air inlets is arranged spacedly on the cylinder.

4. The negative pressure regulator according to claim 1, further comprising a second sealing ring clamped between an outer wall surface of the pressure relief nut and an inner wall surface of the cylinder.

5. The negative pressure regulator according to claim 4, wherein the pressure relief nut comprising a convex ring, and the second sealing ring abuts against a side of the convex ring.

6. The negative pressure regulator according to claim 1, wherein an airflow gap is defined between the cap and the cylinder.

7. The negative pressure regulator according to claim 1, wherein the relief hole is located adjacent to and communicates with the air inlet.

8. A negative pressure regulator, comprising:

a regulator body, comprising a valve body and a cylinder connected to the valve body, the valve body comprising an airflow passage, the cylinder comprising a mounting hole and an air inlet communicating with the airflow passage;

a pressure relief nut, disposed in the mounting hole and comprising a relief hole and an air outlet communicating with the relief hole; and a swivel assembly, comprising a cap and a knob connected with the cap, the cap covering the cylinder and rotatable relative to the valve body, the knob inserted in the pressure relief nut and driven by the cap to optionally move away from the air outlet;

wherein the cap comprises a flange, and the flange comprises an annular groove disposed on a side thereof facing the valve body.

9. The negative pressure regulator according to claim 8, wherein the valve body comprises an annular rib disposed corresponding to the annular groove, and a backflow gap is defined between the annular rib and the annular groove.

* * * * *